United States Patent
Mehrl

(10) Patent No.: US 7,410,260 B2
(45) Date of Patent: Aug. 12, 2008

(54) USE OF A CCD CAMERA IN A PROJECTOR PLATFORM FOR SMART SCREEN CAPABILITY AND OTHER ENHANCEMENTS

(75) Inventor: David J. Mehrl, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 91 days.

(21) Appl. No.: 11/161,465

(22) Filed: Aug. 4, 2005

(65) Prior Publication Data
US 2007/0030460 A1    Feb. 8, 2007

(51) Int. Cl.
*G03B 21/26* (2006.01)
*G03B 21/00* (2006.01)
*G03B 21/14* (2006.01)
*H04N 3/22* (2006.01)
*H04L 27/00* (2006.01)

(52) U.S. Cl. .............. 353/28; 353/29; 353/42; 353/79; 348/745; 375/295

(58) Field of Classification Search ............ 353/42, 353/46, 121, 122, 29, 28, 70, 79, 98; 348/744, 348/745, 750, 789; 396/3; 352/89; 375/295; 359/205, 215, 385; 356/400, 401; 250/205; 355/67, 68

See application file for complete search history.

(56) References Cited

U.S. PATENT DOCUMENTS

| | | | |
|---|---|---|---|
| 4,067,026 A | | 1/1978 | Pappanikolaou |
| 5,235,363 A | * | 8/1993 | Vogeley et al. ............... 353/122 |
| 5,422,693 A | * | 6/1995 | Vogeley et al. ............... 353/122 |
| 6,246,446 B1 | | 6/2001 | Heimbuch et al. |
| 6,474,819 B2 | | 11/2002 | Yoder et al. |
| 6,802,611 B2 | | 10/2004 | Chu et al. |
| 6,877,863 B2 | | 4/2005 | Wood et al. |
| 6,979,087 B2 | * | 12/2005 | Honig et al. ................. 353/121 |
| 7,036,938 B2 | * | 5/2006 | Wang et al. ................... 353/46 |

* cited by examiner

*Primary Examiner*—Melissa Jan Koval
(74) *Attorney, Agent, or Firm*—Wade James Brady, III; Frederick J. Telecky, Jr.

(57) ABSTRACT

An optical projection and capture system includes an image sensor integrated with an optical projection device. Additionally, the integrated device may be coupled with a laser pointer to deliver interactive presentations. The laser pointer may be pulsed to improve identifying and tracking a laser light spot on a projected image. These applications may be extended to rear projection systems for gaming and interactive graphics.

14 Claims, 3 Drawing Sheets

USE OF A CCD CAMERA IN A PROJECTOR PLATFORM FOR SMART SCREEN CAPABILITY AND OTHER ENHANCEMENTS

TECHNICAL FIELD

Disclosed embodiments relate to optical projection devices, and more particularly to integrating an image sensor with an optical projection device along with an input device for smart screen capability and other enhancements.

BACKGROUND

Optical projection devices such as business projectors are prevalent in the marketplace and in businesses for making presentations to clients and customers. A presentation can be recorded for future playback if the client or customer is not physically present to see it, but the recording of such presentations requires additional recording equipment. In addition, a presenter may need to further explain his or her presentation, often by writing on a white board or a chalkboard.

SUMMARY

An image capture device, such as a charge-coupled device (CCD) camera or a complementary metal oxide semiconductor (CMOS) image sensor, may be integrated into a front or rear projection device, such as a business projector or a high-definition television (HDTV). In one embodiment, an input device, such as a laser pointer, may be used in conjunction with the integrated device to enable and facilitate interactive presentations. The laser pointer may be pulsed to improve identifying and tracking of a laser light spot on a projected image. In another embodiment, the application may be extended to rear projection systems for gaming and interactive graphics.

BRIEF DESCRIPTION OF THE DRAWINGS

FIG. 4 illustrates a modified input device; and

DETAILED DESCRIPTION OF THE PREFERRED EMBODIMENTS

Figure 1:
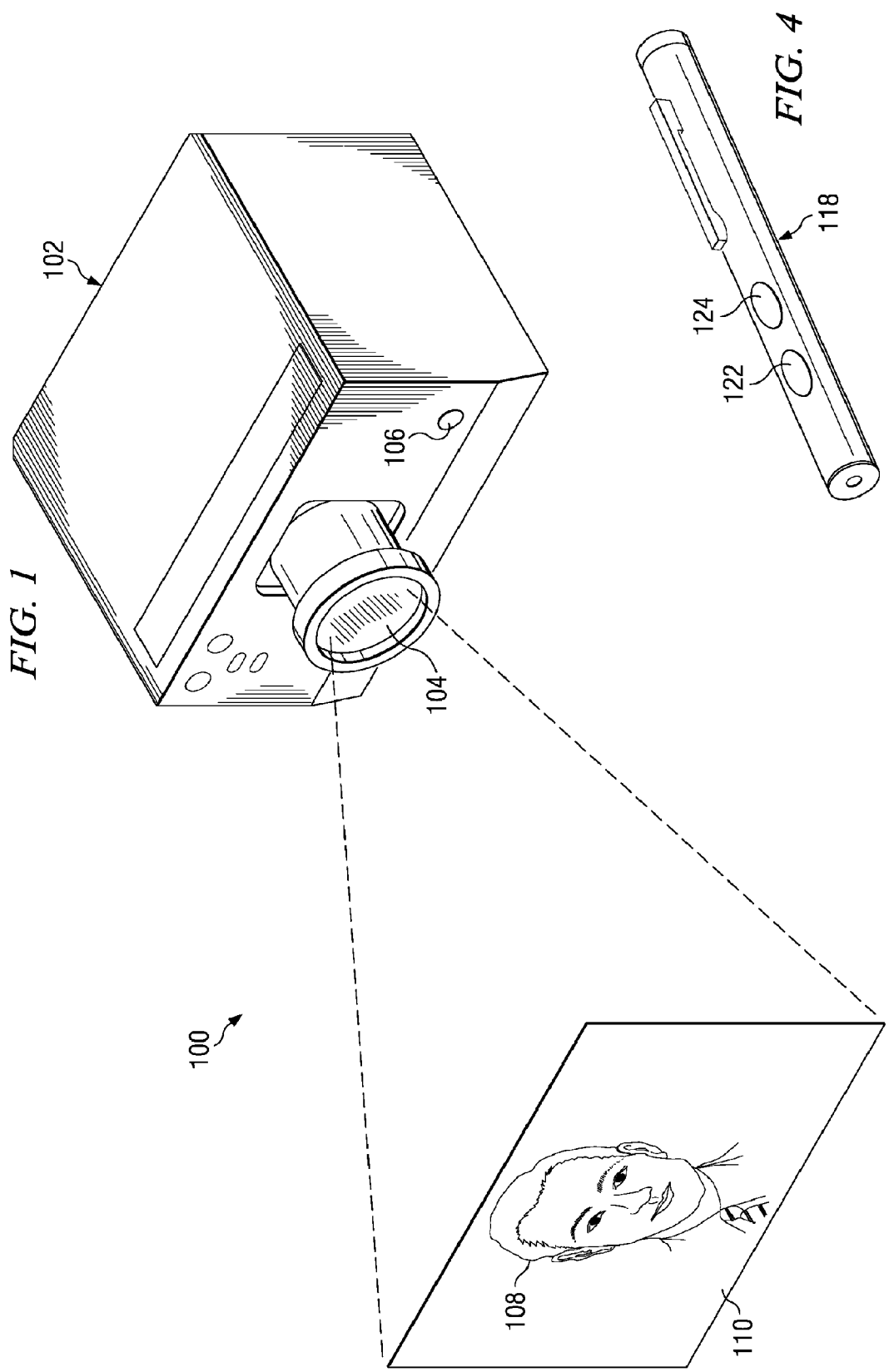
FIG. 1 illustrates an image sensor integrated within an optical projection device.

FIG. 1 illustrates an optical projection system 100 with a projector 102 for projecting an image 108 onto a screen 110 through a projection lens 104. The image 108 may also be a slideshow presentation or videos. Also included in this system 100 is an image capture device 106, such as a charged-coupled device (CCD) camera or a complementary metal oxide semiconductor (CMOS) image sensor. The image capture device 106 may be embedded within the projector 102. A presently disclosed embodiment integrates a CCD imaging camera 106 into the projector 102 for monitoring a projected image 108 in a front projection system 100. The CCD camera 106 appears as a small lens or a pinhole imaging through a small hole in the projector 102, but outside the circumference of the existing projection lens 104 (as illustrated in the figure). Alternatively, the CCD camera 106 may share the same optic path as the projection lens 104. For example, the CCD camera 106 may use the lower half of the existing projection lens 104 as part of its imaging optics path, if the lower half of the existing projection lens 104 is unused, which is sometimes the case with many table top projectors using non-telecentric optics.

Integrating a CCD camera 106 with a projector 102 provides several value-added functions. The camera 106 may assess the distance between the projector 102 and the display screen 110 with ambient light sensing, and reduce lamp power in order to extend lamp life and reduce heat. This can also be accomplished by looking at the apparent size of the projected image 108 acquired by image processing in the camera 106. For example, the smaller the image 108 in the camera 106, the further away the screen 110. This technique can also be combined with the ambient light sensing to determine the amount of lamp power reduction. Additionally, the CCD camera 106 may also monitor and correct image 108 brightness or balance color/intensity as necessary to compensate for lamp aging. Color/intensity corrections may be achieved by boosting white levels or specific color levels. The projector 102 may also alert or warn the user when the light source needs replacement.

Figure 2:
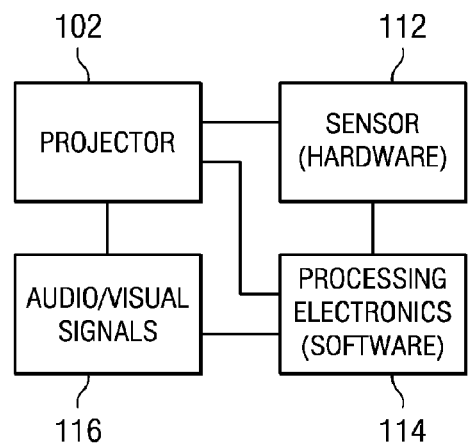
FIG. 2 illustrates an electrical block diagram of the components of the integrated optical capture/projection device.

FIG. 2 is an electrical block diagram illustrating some of the processing electronics and image capture hardware/software. Electronic circuitry such as processing electronics 114 and a hardware sensor 112 are integrated with the projector 102. The hardware sensor 112 may be integrated with the CCD camera 106 and embedded within the projector 102 to provide ambient light sensing, and to monitor brightness and balance color/intensity of the displayed image 108. The hardware sensor 112 may be processing electronics 114 that adjust the light source within the projector 102 to extend the lamp life and reduce heat to the overall projection system 100, depending on readings and detections from the hardware sensor 112. Consequently, the processing electronics 114 may also emit or cause to emit audio or visual signals 116 to alert or warn the user when the light source needs to be replaced. Additionally, the hardware sensor 112 and the processing electronics 114 may have real-time image processing capabilities (i.e. display, capture, process, adjust, or compensate an image 108 in real-time).

Figure 3:
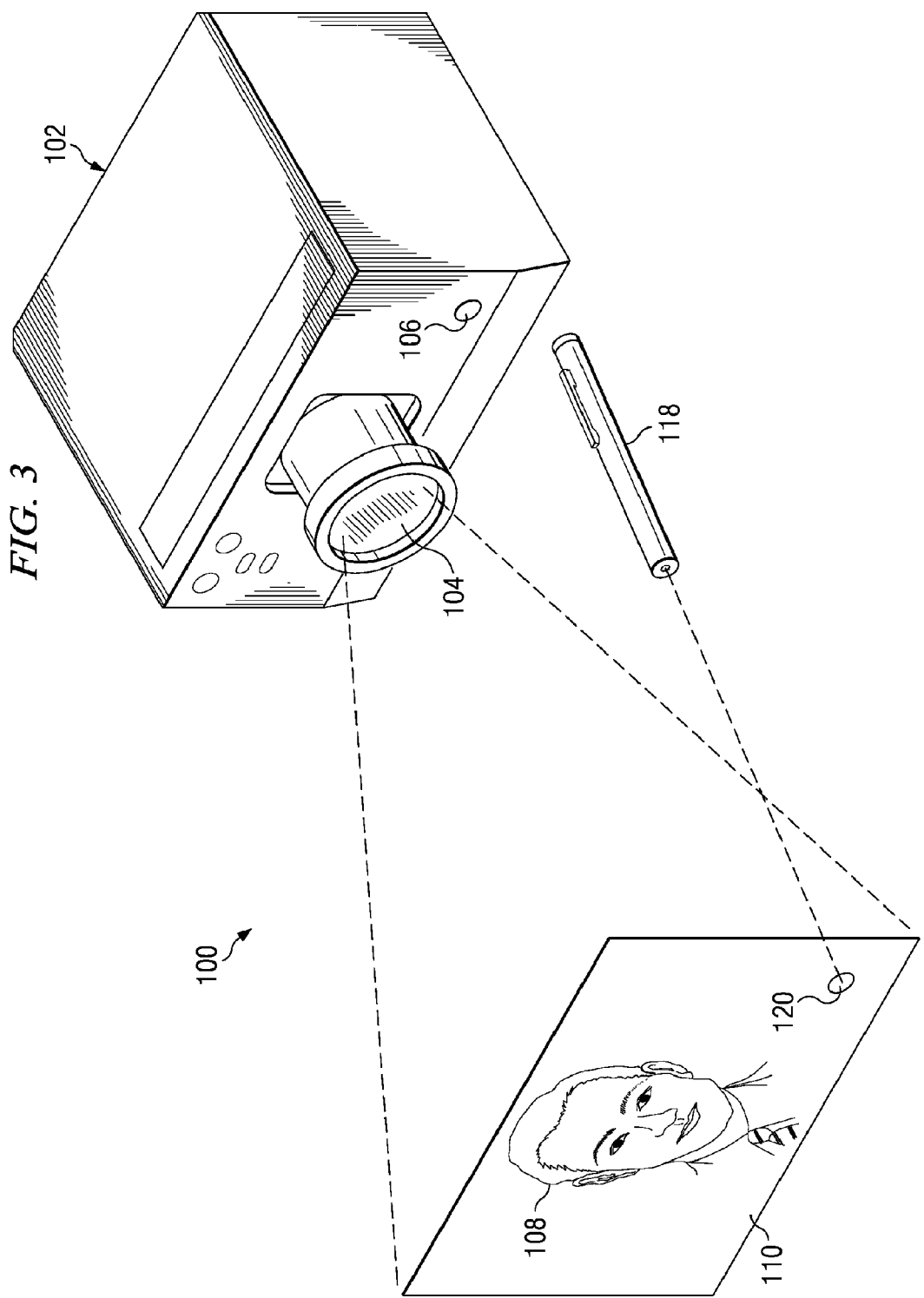
FIG. 3 illustrates an integrated optical capture/projection device coupled with an input device.

FIG. 3 illustrates another embodiment, in which the integrated CCD camera 106 within a projector 102 may detect a marking 120 from an input device 118 and provide "smart screen" capability. The input device 118 may be a laser pointer and the marking 120 may be a laser light spot. In this embodiment, the position of a laser light spot 120 could be detected and used as an input to the system 100, thereby enabling various functions that would normally be performed by a computer mouse, but without any necessity of electrical communication between the system 100 and the laser pointer 118. The user could point/click the laser pointer 118 at an application's action icon projected on a screen 110 just as if he was using a mouse (e.g. PowerPoint has arrow icons that you can click on to advance to the next slide). By modifying the laser pointer 118 to modulate its output (e.g. toggle between on/off states), upon the press of a button on the pointer 118, this modulation could also be detected by the system 100 and could effectively serve as the "click" functionality analogous to the click functionality of a typical computer mouse input device. Again, however, this approach has the advantage of not requiring electrical connection to and communication with the system 100 from the pointer 118.

Real-time image processing capabilities may be provided, such as by a digital signal processor (DSP) to detect movement of the laser light spot 120 from the laser pointer 118.

Such processing capabilities may be provided by the integrated processing electronics hardware 112 and software 114 embedded within the projector 102 as previously described. As the projector 102 projects an image 108 onto a screen 110, the projection screen 110 functions like a smart board. The presenter may use the laser pointer 118 as a normal laser pointer 118 by pushing a first normal operating button 122 and projecting a laser light spot 120 onto the screen 110 as illustrated in FIG. 4. Additionally, the laser pointer 118 could also be customized to have a second momentary contact button 124, which would pulse or oscillate the laser pointer 118 and put it into "command mode" at a certain frequency. For example, the laser pointer 118 may be pulsed at 15 Hz in "command mode." Pulsing the laser pointer 118 along with differential successive frame motion detection technique may further be used to enhance detection/sensitivity of the laser light spot 120 on the screen 110, thereby making it easier to identify or track the laser light spot 120 on the screen 110.

If a user wants to effect a "click" action, he could press harder or increase the pressure on the laser pointer's 118 button 124, which would then respond with a tactile "click" feedback response (much like the "click" action of a conventional mouse button). Such action would then close a switch contact pair, which would then cause the laser pointer 118 to pulse at about 15 Hz. Once assured that a mouse click event is recognized, appropriate actions would then be taken. The system 100 would continue to monitor and track where the laser light spot 120 resides in the image 108, to then capture "drag" operations, and send appropriate mouse drag events, which contain the X, Y pixel positions of the current laser light spot location 120 within the image 108. It would then continue to monitor the image 108 until the laser light spot 120 stopped pulsing, where it would then issue a left mouse click "break" event. By monitoring the subsequent motion of the laser light spot 120 and tracking it until the user releases the "mouse button" on the laser pointer 118, the laser pointer 118 is doubling as a mouse in this way (can be "clicked", "dragged", or "released"), thereby providing portable built-in "smart screen" capability. The ensuing "mouse commands" can then be used by the display or television electronics, or sent to a connected system, such as a PC or set-top box.

Additionally, during "tracking" of the laser light spot 120 to catch "drag" operations, localized regions of the image 108 may be zoomed in to reduce the real-time processing overhead. The reason for this is that once the laser pointer 118 has been identified to be in command mode, and that the position of the laser pointer spot 120 has been identified within the image 108, there will be minimal changes in its position from one acquired CCD frame to the next acquired frame. Since analyzing the image 108 for mouse movement is a processing intensive operation, limiting the analysis to a much smaller portion, such as zooming in on the image 108, can thereby minimize the processing intensive operation.

In another embodiment, the pulsing circuitry and/or frequency of the laser pointer 118 may be synchronized between the room's AC wiring and the frame rate of the CCD camera 106. Alternately, the pulsing circuitry of the laser pointer 118 could be synchronized to the projector 102 frame rate by means of a small optical sensor (not shown) built into the laser pointer 118 that would sense the flicker rate of the ambient light produced by the projector screen 110. In yet another embodiment, a small wireless transmitter in the projector 102 combined with a small wireless receiver (not shown) in the laser pointer 118 could allow the projector 102 to send a synchronous signal to the laser pointer 118. In these cases, whether relying on ambient 60 Hz AC fields, projector light flicker, or wireless signal, the synchronization signals would drive a phase-lock loop in the laser pointer 118 that would provide the precise phase locked synchronization signal so that the laser pointer 118 could optionally pulse in exact steps with the projector 102 and/or camera 106 frame rate.

Frame differencing of a pulsed laser light as described above may enhance image detection and sensitivity. A video processor (not shown) would do conventional analysis of sequential frames to detect image regions 108 that are pulsating at 15 Hz, and thus be able to initially detect the presence of the pulsating laser light spot 120. Use of the relatively slow 15 Hz frequency would assure that within any two successively captured frames (at a typical 30 Hz frames per second) from an image 108, at least one of those frames would capture the laser light spot 120 in some manner, whether the laser pointer 118 was "on" or "off" during the entire frame exposure. It is not necessary for the camera's 106 frame rate to be synchronized to the projector's 102 frame rate. The methodology for detecting the presence of the 15 Hz pulsating laser pointer 118 is to successively subtract sequentially acquired frames (doing a pixel-by-pixel subtraction of the pixel intensities and finding the absolute value of this "difference" image), and then looking for sudden changes that highlight a transition (associated with the rising or falling of the pulsing laser pointer 118). Additionally, the frame differencing technique may be coupled with closely related synchronous detection techniques to boost sensitivity and reduce noise. The combined techniques require hardware sensor 112 and processing electronics 114 superimposing a mouse pointer on the image 108 to give the user audio/visual signal feedbacks 116 in the event that the laser pointer spot 120 is hard to visualize.

In another embodiment, the pulsing laser pointer 118 may employ time-encoded signals. Multiple time-sequence patterns and pulses may be generated corresponding to the actions of a computer "mouse." For example, the "mouse button down", "mouse button hold", and the "mouse button up" events may be employed with a single button (122 or 124) on the laser pointer 118. When you first push the "mouse button down", it sends out a pulse train sequence at frequency $f_1$. After holding the "mouse button down," it automatically changes the pulse frequency to a second frequency $f_2$ that indicates that the button is being held down. When the button (122 or 124) is released, it sends out a short burst of pulses at frequency $f_3$ that indicates that the mouse button has been released. The changing frequencies make it easier to identify the different events. The laser pointer 118 could also have additional buttons (not shown) that sends out other frequencies or otherwise specially encoded temporal patterns.

Figure 5:
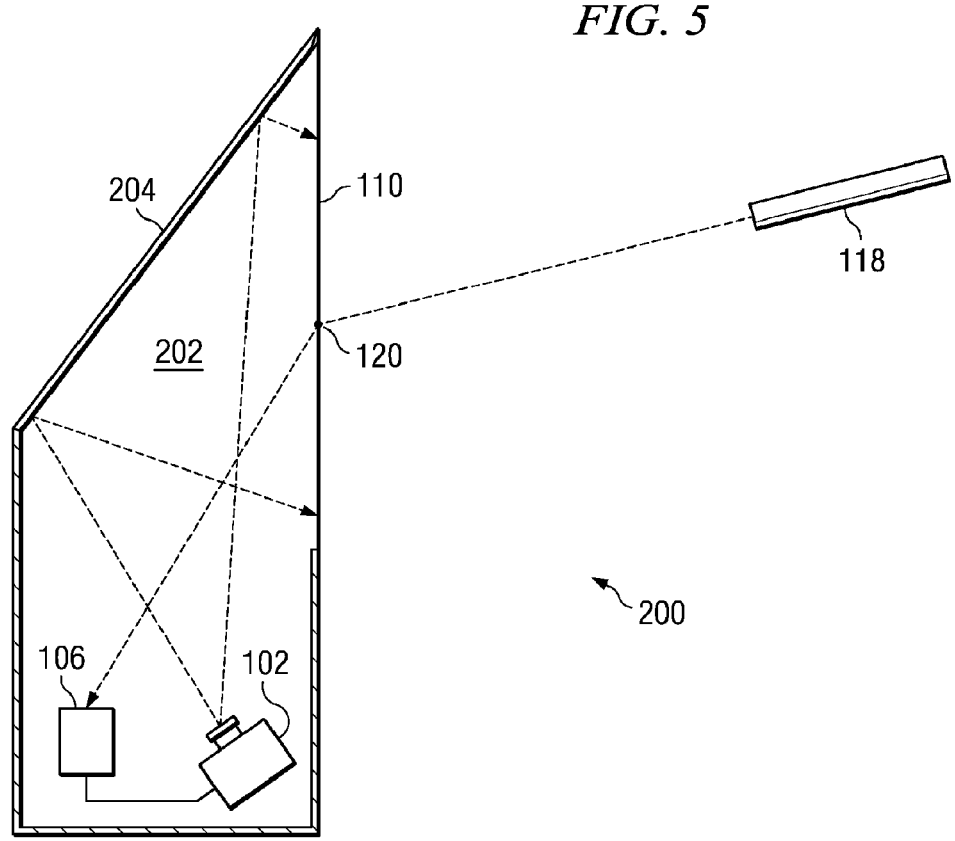
FIG. 5 illustrates an integrated optical capture/projection device in a rear-projection application.

The above described embodiments may be used in rear projection systems 200, namely rear projection televisions (RPTV) or high-definition television (HDTV) for games (shooting type games), interactive graphics, or surfing on the Internet, etc. FIG. 5 illustrates an integrated optical capture/projection device for a rear-projection system 200, generally starting with a RPTV or a HDTV 202. Inside the television 202 is an optical projection device 102 integrated with a CCD camera 106. While the optical projection device 102 can project an image onto a screen 110 through a fold mirror 204, the CCD camera 106 can record and capture the image from the screen 110. Accordingly, a laser light spot 120 may also be projected from a laser pointer 118 onto a screen 110 as previously discussed. In a rear-projection application 200, the laser light spot 120 can penetrate through the television screen 110 because of the screen's translucency. Consequently, the laser light spot 120 may be identified, recorded, and captured by the CCD camera 106, and the information may be processed by the processing electronics similar to the ones previously described. Additionally, other optical elements (not shown) may be required to facilitate in the capture and projection of an image on the screen 110.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes that come within the meaning and ranges of equivalents thereof are intended to be embraced therein.

Additionally, the section headings herein are provided for consistency with the suggestions under 37 C.F.R. § 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. An optical projection and capture system, comprising:
   a projection device operable to project a first image onto a screen;
   an image sensor operable to capture a second image from the screen; and
   an input device operable to produce a directed output light that is projected onto the screen, wherein an oscillating duty cycle of the directed output light facilitates in identifying and tracking the directed output light on the screen, and wherein the directed output light is received and detected in the image sensor.

2. A system according to claim 1, wherein the input device is a laser pointer.

3. A system according to claim 1, wherein the oscillating duty cycle of the input device is about 15 Hz.

4. A system according to claim 1, wherein the oscillating duty cycle of the input device is synchronized to the first image of the projection device or the second image of the image sensor.

5. A system according to claim 1, wherein the directed output light is further modulated to provide commands to electronic processing circuitry coupled to the image sensor.

6. A system according to claim 1, wherein the oscillating duty cycle of the input device comprises time-encoded signals and oscillations.

7. A system according to claim 1, wherein the image sensor is further operable to capture a zoomed third image from the screen in response to the directed output light received and detected in the image sensor, the zoomed third image smaller than the second image.

8. An optical rear projection and capture system comprising:
   a projection device operable to project the first image through a screen for viewing on a front side of the screen;
   an input device operable to produced a marking on the front side of the screen and also through and on a back side of the screen, the marking having an oscillating duty cycle; and
   an image sensor operable to distinguish, based at least partially on the oscillating duty cycle, between a second image on the back side of the screen and the marking.

9. A system according to claim 8, wherein the marking is operable to be captured by the image sensor.

10. A system according to claim 8, wherein the input device is a laser pointer.

11. A system according to claim 8, wherein the oscillating duty cycle of the input device is about 15 Hz.

12. A system according to claim 8, wherein the oscillating duty cycle of the input device is synchronized to the first image of the projection device or the second image of the image sensor.

13. A system according to claim 8, wherein the oscillating duty cycle of the input device comprises time-encoded signals and oscillations.

14. A system according to claim 8, wherein the image sensor is further operable to capture a zoomed third image from the back side of the screen in response to the marking detected by the image sensor, the zoomed third image smaller than the second image.

* * * * *